Patented Mar. 14, 1933

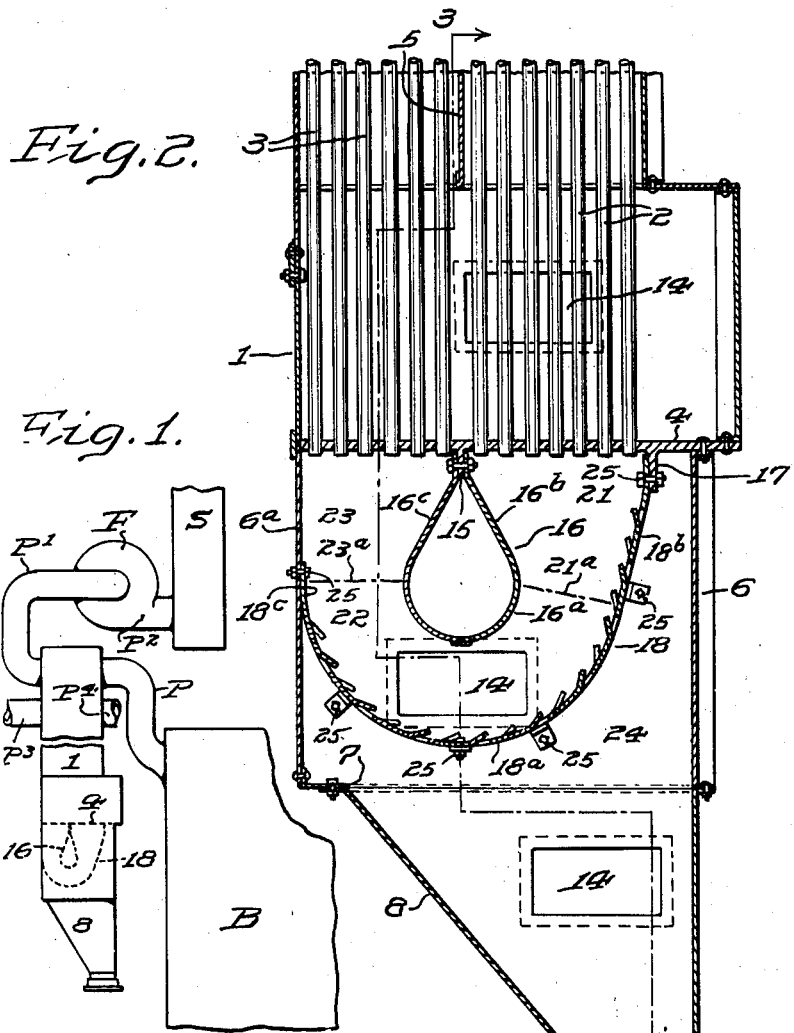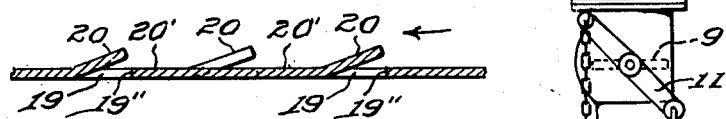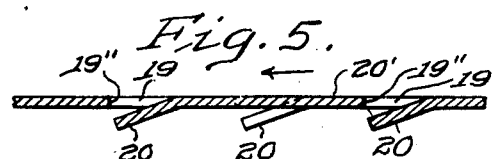

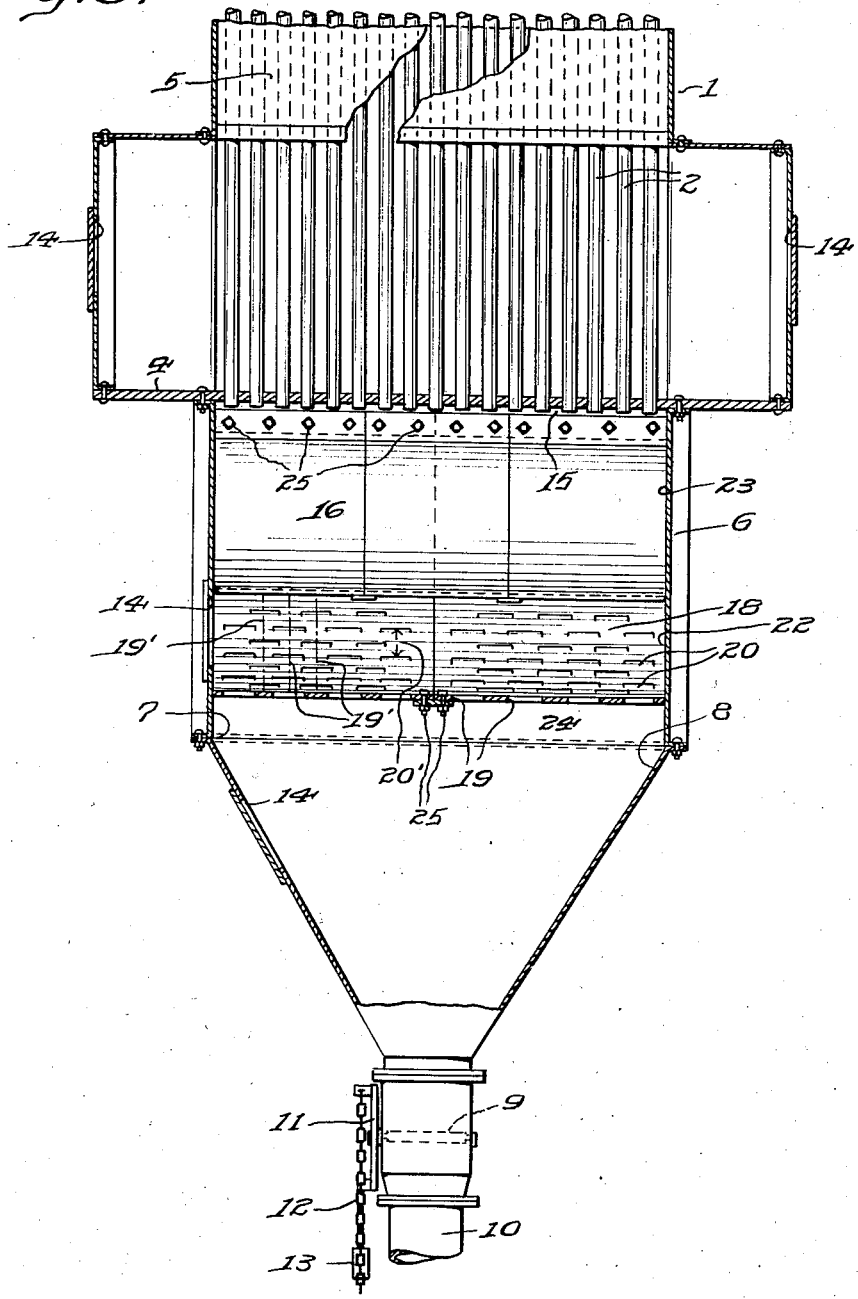

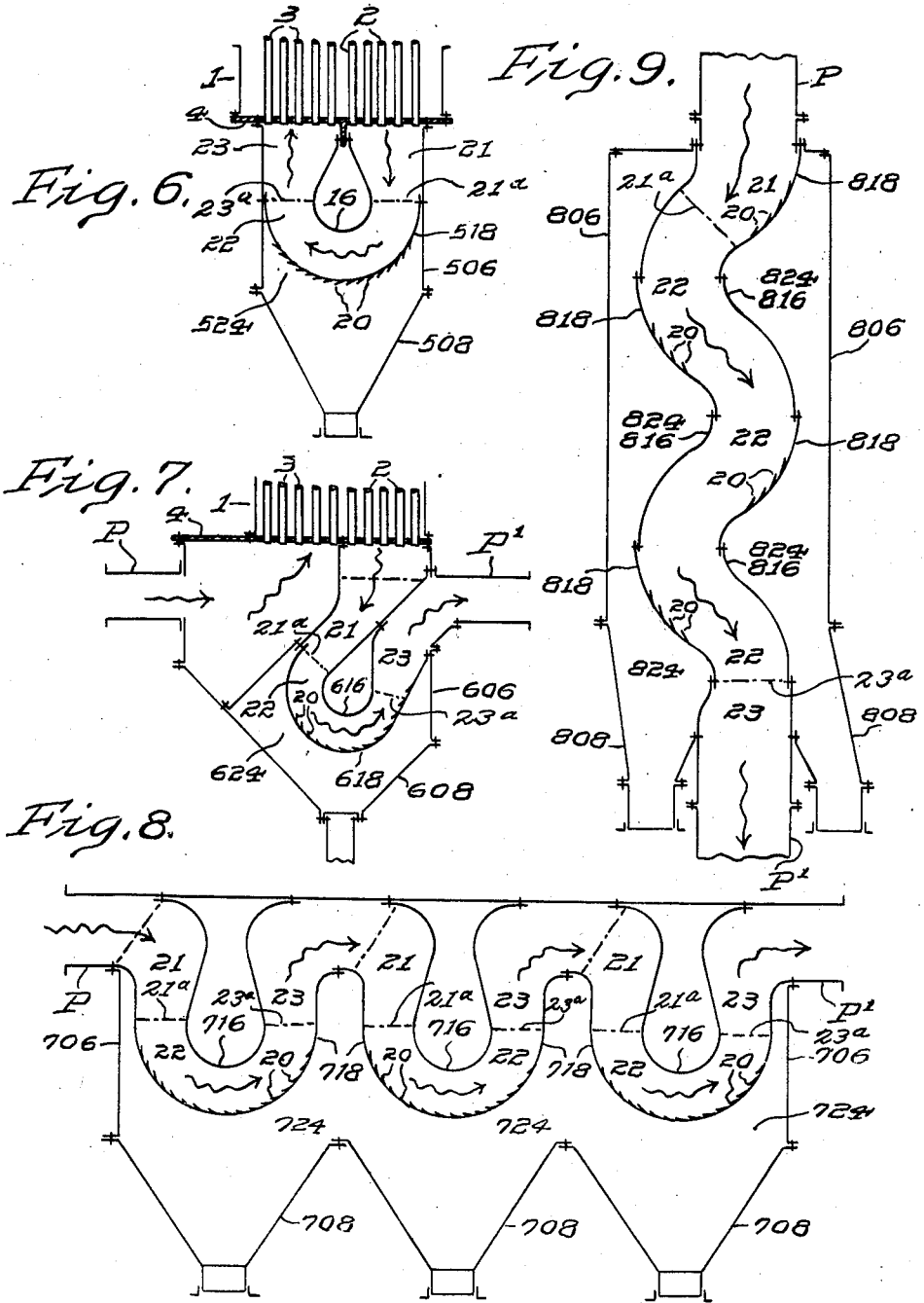

1,901,370

UNITED STATES PATENT OFFICE

MAX H. KUHNER, OF CORNWELLS HEIGHTS, PENNSYLVANIA, ASSIGNOR TO BADEN-HAUSEN CORPORATION, OF CORNWELLS HEIGHTS, PENNSYLVANIA, A CORPORATION OF PENNSYLVANIA

DUST SEPARATING AND COLLECTING DEVICE

Application filed September 27, 1930. Serial No. 484,730.

My invention relates to dust separating and collecting devices, and while it more particularly relates to devices for separating dust and soot from the gases of combustion from a furnace, it is likewise applicable for removing fine dust particles of any character from a similar gaseous carrier, used in connection with any apparatus or device which produces dust, such as saw mills, cement mills, sand blasting machinery and the like, whenever it is desirable to remove the same from such a carrier.

In burning pulverized coal, a great deal of the ash and incombustibles are carried by the flue gases in the form of a fine dust and unless removed therefrom, they go to the stack and issuing therefrom as smoke, soot and fine ash settle upon everything surrounding the plant. This is highly objectionable and many expedients have been resorted to in an attempt to remove this dust from the gases of combustion prior to their admission to the stack.

It is the object of the present invention to provide, at any suitable or available place in the conduit through which the gases of combustion from a furnace pass, a simple and effective device for automatically arresting the fine dust particles and collecting them before they issue from the stack, or in fact before the gases are delivered to the stack.

A further object of my invention is to provide a fine dust separating device of such a character that it may be located in various places, for example, in the boiler itself between the steam-generating-section and the economizer, or at the ends of an air-heater, as in the example shown in the accompanying drawings, or in the flue before it reaches the air-heater or the stack.

A further object of my invention is to provide a flue through which a current of dust laden gases is drawn by an induced draft or suction fan with a dust separator operative to remove the dust therefrom prior to the passage of the said gases through the fan, to substantially reduce the wear and tear, to which such a fan is otherwise subjected, and to correspondingly increase the life of the fan.

Further objects of my invention are to provide a construction in which the draft loss is very low as compared with most collectors, which does not take up any substantial additional space since it can be located in the air-heater, or in the economizer section of a boiler, or even in the flue itself as a part of the flue.

A further object is to make the curved separator wall, with slots therethrough and tongues, of heavy sheet metal plates, and in sections, so that a section can be replaced from time to time, as it becomes necessary by simply removing a few bolts, inserting a new section, and rebolting them together.

A further object of my invention is to provide a construction in which no additional or other fan or pump is needed than that ordinarily used in providing the induced draft generally employed in furnaces burning powdered fuel.

A further object of my invention is to dispense with the use of any and all moving parts in the dust separator section.

A further object of this invention is to provide a passage with a wall which smoothly directs and guides a stream of dust laden gas through a relatively small semicircular path, notwithstanding the fact that the guiding wall is provided with a relatively large number of perforations or openings.

In the drawings forming a part of this specification:—

Fig. 1 is a diagrammatic view showing an air-heater (the lower end of which is shown in Fig. 2) provided with my improved dust separator, installed in an induced draft system of a furnace or boiler.

Fig. 2 is, generally, a vertical sectional view through the lower end of an air-heater and through my improved dust separator, attached thereto and cooperating therewith.

Fig. 3 is also a vertical sectional view through the same apparatus, at right angles to that shown in Fig. 2 and on the line 3—3 in Fig. 2.

Fig. 4 is a longitudinal sectional view, on a larger scale, of a fragmentary portion of the outer wall or partition of the separator before it is bent into substantially semicircular form, showing the vanes or tongues punched up out of the sheet metal, the openings and the relatively long spaces between consecutive openings of a longitudinal series of openings.

Fig. 5 is a view similar to Fig. 4 but showing a modification wherein the tongues project downwardly and in the direction of the travel of the gases thereover.

Figs. 6 to 9 inclusive diagrammatically illustrate further modified forms of my invention wherein Fig. 6 shows my improved dust separator arranged similarly to that shown in Fig. 2, except that the device is symmetrical with respect to a plane passing through the axis of the deflector and the tongues or vanes are arranged in the manner shown in Fig. 5;

Fig. 7 shows an air-heater provided with my dust separator whereby the gases are treated after their travel throughout the entire length of the air-heater;

Fig. 8 shows an arrangement whereby a flue is provided with a dust separator embodying my invention and comprising a plurality of units arranged in a horizontal series; and Fig. 9 shows a further modification of my improved dust separator, applied to a flue, wherein the dust carrying gases pass vertically downwardly through the separator.

The air-heater 1 is of a conventional type. In Fig. 1 it is shown diagrammatically as installed in an induced draft system of a boiler B the hot gases of combustion from the furnace of the boiler B are lead through a pipe P which communicates with the top of the air-heater 1. After traversing the air-heater the gases are conducted through a pipe P¹ to the induced draft fan F from which they are discharged through a pipe P² into the stack S.

The gases of combustion delivered to the air-heater 1 through the pipe P pass downwardly through the vertical downcomer tubes 2 to a suitable chamber, and after passing through this chamber they enter and travel through the vertical upcomer tubes 3 whence they are delivered to the pipe P¹.

The tubes 2 and 3 pass through the lower wall 4 of the air-heater chamber, and the said chamber is divided longitudinally by an imperforate partition 5 extending the width of the chamber and terminating at a substantial distance above the lower wall 4.

The air to be heated is delivered to the heater 1 through the pipe P³ into the spaces surrounding the upper ends of the upcomer tubes 3 and passing downwardly between the pipes 3, it travels around the lower end of the partition 5 and thence upwardly between the downcomer tubes 2 and thence, after having thus traversed the surfaces of the upcomers 3 and of the downcomers 2 throughout their entire length, the heated air is delivered through pipes P⁴ to any desired point, as for instance to the combustion chamber of the furnace. In general, the air-heater above described is of a well known type except that instead of delivering the gases of combustion from the downcomers 2 into a plain or ordinary chamber, I have substituted therefor my improved dust separating device, which will be next described, using the wall 4 of the heater as the upper wall of my dust separator.

The housing 6 of my improved separator is preferably rectangular and is closed on all sides except the bottom which is preferably provided with a large opening 7, communicating with the soot hopper 8, having preferably downwardly tapering sides terminating in a valve or damper 9, normally closing the hopper and the chamber and the discharge pipe 10 below it. This damper may be operated by a lever 11, actuated by chain 12 and counterweight 13.

I also preferably provide the lower end of the heater 1, the housing 6, and the hopper 8, with hand-holes or man-holes 14, of course, normally closed.

Within the housing 6 and bolted to a transverse rib or flange 15 depending from the bottom of the wall 4 is a deflector or baffle 16 preferably made of sheet metal and, in the construction illustrated in the drawings, somewhat pear-shaped in vertical cross-section. The baffle 16 extends the full width of the housing 1 from side wall to side wall. The lower half, 16ª of the deflector or baffle 16 is semi-circular in transverse cross-section and the said deflector or baffle forms the inner wall of the inlet chamber, of the semi-circular passage and of the outlet chamber, all to be referred to again below.

Also depending from the wall 4 and extending parallel to the rib 15, is a second flange or rib 17, positioned just beyond or outside of the lower ends of the bank of downcomer tubes 2. Bolted to this rib or flange 17, is the upper end of a metal partition 18, preferably made out of sheet metal, and having small openings 19 punched therein in such a manner as to form tongues or vanes 20. The openings 19 are preferably rectangular, and the tongues or vanes 20 are severed from the sheet metal on three sides only, thereby making the tongues integral with the sheet metal. They preferably extend but slightly above the surface of the sheet metal and generally all in the same general direction.

The ends of the tongues 20 are raised only slightly above the inner surface of the wall or partition 18 so that the effective passages through the openings 18 are relatively small. The openings are arranged in parallel series or rows extending longitudinally of the partition (as is indicated by the dot and dash lines 19' through three consecutive rows or series in Fig. 3) and the openings in each longitudinal row or series are spaced relatively far apart from each other, in order to provide a considerable and substantial imperforate surface 20' between consecutive tongues of a series of tongues, to form and maintain the gases, passing thereover, in the form of a thin rapidly moving stream and to guide said gases smoothly through a substantially semi-circular path.

The openings and tongues in one longitudinal series through the partition 18 are arranged in a staggered relationship with respect to the openings and tongues in the next adjacent series. This also contributes greatly to the achievement of continuous stretches or reaches of imperforate arcuate effective gas-guiding surfaces 20' extending transversely to the longitudinal series or rows of openings and tongues, as well as longitudinally of the wall.

From the flange or rib 17, the sheet metal extends downwardly, straight, to form, with the adjacent side 16$^b$ of the deflector or baffle 16, and the outer wall 18$^b$ an inlet chamber 21 of constantly decreasing cross-sectional area from its inlet side, communicating with the tubes 2, to its delivery end, indicated by the dot-and-dash line 21$^a$. From this point, the partition 18 is circular or semicircular. The portion 18$^a$ forms with the lower end 16$^a$ of the baffle 16 a semicircular passage 22 of constant cross-sectional area. The upper end 18$^c$ of the semicircular portion 18$^a$ may terminate substantially on the line of the axis of the semicircular lower end 16$^a$ of the baffle 16 and it may be bolted to the rear wall 6$^a$ of the housing. The upper end of the semicircular passage 22 communicates directly with the small end (indicated by the dot-and-dash line 23$^a$) of the outlet chamber 23, formed by and between the said wall 6$^a$ and the tapering side 16$^c$ of the baffle 16. The portion 18$^a$ of the partition is concentric with the axis of the semicircular portion 16$^a$ of the deflector 16. All the tongues 20 in the partition 18 extend slightly into the semicircular passage 22 and in a direction counter to the direction of the flow of the gases thereover. The partition 18 so divides the interior of the housing 6 as to form a dust collecting chamber 24 communicating with the hopper 8 through the opening 7.

The partition 18 is preferably made of heavy punched sheet metal plates, secured to the casing and to each other by bolts 25 so that a worn section can be easily replaced.

It will now be apparent that the above construction provides a U-shaped passage comprising an inlet chamber 21, a semi-circular passage 22 and an outlet chamber 23 all of the same and constant width; the inlet chamber 21 being of constantly decreasing cross-sectional area, the semi-circular passage 22 being of constant cross-sectional area, and connecting the smaller ends of the chambers 21 and 23, and the outlet chamber 23 being of constantly increasing cross-sectional area.

By virtue of this construction, the speed of the gases of combustion entering the inlet chamber 21 is constantly increased as the gases traverse the inlet chamber 21 and the high speed so imparted to the gases is maintained in the semicircular passage 22, the cross-sectional area of which is the same as the cross-sectional area of the smaller end of the inlet passage 21. The outlet passage 23 is however of constantly increased cross-sectional area from its inlet end, thereby reducing the resistance to the discharge of the gases at high speed thereinto from the semicircular passage 22.

The purpose of the semicircular passage and of the impartation to the gases of the relatively high speed while passing therethrough is to utilize the centrifugal force, developed in the particles of dust floating in the gases of combustion by their rapid movement through said semicircular path, to throw those particles outwardly against the partition 18 into contact with the tongues or vanes 20, which arrest the movement of the said dust and particles of solid matter, and direct them through the openings 19 below the tongues into the collecting chamber 24 and the hopper 8.

By thus substantially increasing the speed of the products of combustion in the inlet chamber 21, a considerable amount of centrifugal force is developed in the small solid particles when the thin stream of gases is caused to traverse the passage 22, the longitudinal axis of which is a semicircle of relatively small radius, and this enables me to remove from the gases of combustion substantially all of the dust and fine particles before the gases of combustion enter the induced draft fan. The removal of the dust from the gases prior to their delivery to and passage through the exhaust fan results in a great decrease in the wear and tear on the fan. The life of the fan is substantially increased.

In the construction illustrated in Fig. 6, the dust separator is connected to the lower end of an air-heater 1 to communicate with the lower ends of the downcomers 2 and the upcomers 3. In this case, the ends of the curved or semicircular partition 518 are attached to the vertical walls of the housing 506, but the tongues or vanes 20 are inclined outwardly from the passage 22 and rearwardly as in Fig. 5. Below the partition is the dust collecting chamber 524 and the hoppers 508. In this modification, to the gases of combustion, bearing in them minute particles of solid matter, is imparted an increased speed in passing from the inlet chamber 21 through the substantially semicircular passage 22 between the partition 518 and the deflector 16 and the solid particles thrown outwardly from the axis of the deflector 16 by centrifugal force and momentum, strike against the square shoulder 19″ of the openings 19 (see Fig. 5), their motion is arrested, and they are carried through the opening 19 into the dust collecting chamber 524 beneath.

In Fig. 7 the housing of my improved dust collector is shown as removing the dust from the gases after they have traversed the entire length of the air heater 1. In this case the gases of combustion from the flue P enter the lower ends of the upcomers 3 and at the upper end of the air heater 1 they are caused to enter the downcomers 2, at the lower ends of which is the housing 606 with inlet chamber 21 of the dust separator. In this case, as before, the cross-sectional area of the chamber 21 constantly diminishes until it reaches the semicircular passage 22 where the gases are given a rapid rotary movement throwing the dust and solid particles outwardly against the partition 618 where it encounters the tongues or vanes 20 as in Fig. 2 and the dust falls into the dust collecting chamber 624 and hopper 608. On leaving the passage 22 the gases enter the chamber 23 of constantly increasing area as in Fig. 2 and pass on to the flue P¹.

In Fig. 8 is shown a section of the flue P from the combustion chamber of a furnace or from any other dust forming apparatus, one end of which communicates with the housing 706 of a dust separator similar to the dust separators above described in that the gases of combustion from the flue P directly enter the chamber 21, of constantly decreasing cross-sectional area, thence entering the passage 22 which is semicircular and between the deflector 716 and the partition 718 having the tongues 20 arranged as shown in Fig. 2 and Fig. 4. The solid particles carried by the carrier gases are thrown out by centrifugal force against the partition 718 into the settling chamber 724 terminating in the hoppers 708. After passing through the passage 22, the gases traverse the exit chamber 23. In this arrangement I have shown a plurality of units arranged in a sequence wherein after traversing the first unit, as above described, the gases enter a second unit like the first, and similarly, after traversing the second unit, enter a third unit wherein the gases are subjected to like treatment and the dust carried thereby is separated from the gases. In this case the general direction of the gases through the separator is horizontal, that is to say, the gas enters the separator through the horizontal flue P and departs therefrom through a horizontally disposed flue P¹.

In Fig. 9 is a modification similar to that shown in Fig. 8 except that the gases from the flue P pass downwardly vertically into the housing 806 into and through a passage therethrough, the upper end being a tapering inlet chamber 21 discharging into a passage 22 of substantially constant cross-sectional area. This passage 22 comprises substantially a plurality of semicircular passages 22—22 arranged in sequence or series between the deflectors 816 and the partitions 818, the latter being provided with tongues or vanes 20 in those sides of the partitions 818, which guide the gases through an arcuate course or path, and against which the particles of solid matter carried by the gases are thrown by centrifugal force. After passing this series of substantially semicircular passages 22 of constant cross-sectional area the gases traverse a tapering discharge chamber 23 of constantly increasing cross-sectional area communicating with the flue P¹. In this case the dust and small particles separated from the gas fall gravitationally and by centrifugal force through the openings 19 between the tongues or vanes 20 into a large dust collecting and settling chamber 824, the lower end of which is provided with the hopper-like structures 808 in which the dust and soot accumulate and from which, from time to time, they may be removed.

In all the embodiments of my invention above discussed the dust laden gases coming from the furnace or other apparatus are caused to pass through the tapering inlet chamber the cross-sectional area of which constantly decreases, to increase the speed thereof and to reduce the thickness of the stream to a relatively small dimension, and then the thin stream of gas is caused to pass through a substantially semi-circular passage 22 at a relatively high speed, whereby the centrifugal force developed in the small particles floating in the stream causes them to be thrown in the stream against the partition provided with the openings 19 and tongues 20 which are operative to arrest the motion of the particles and cause them to fall in a settling chamber. On leaving the passage 22 the gases enter the outlet chamber 23 which is of increasing cross-sectional area to facilitate the travel of the gases at a relatively high speed through the passage 22. Since the tongues or vanes 20 lie but a slight distance above the guiding surface 20′ of the partition, and do not substantially interfere with the free travel of the gases through the passage 22, it is generally advisable to have the tongues project into the passage and counter to the travel of the gases therethrough to catch the particles moving near the partition, but not touching it. If, however, the gases are given a very high speed, substantially all of the particles can readily be thrown against the partition during the semi-circular travel of the gases and then the tongues may project outwardly from the outer side of the passage 22, as shown in Figs. 5 and 6, the solid particles of dust will strike the curved guiding surface 20′ of the partition and sliding thereon under the action of the stream of gases, will either drop into the openings 19 or will be impelled against the wall 19″ of an opening and fall therethrough into the settling chamber.

It is also to be understood that in all of the modifications described in Figs. 5 to 9 inclusive, the openings 19 are preferably arranged in the staggered relationship above described in order to provide an extended smooth guiding surface 20′ between consecutive openings in a longitudinal series through the partition or wall 18.

The dust separator above described is particularly adapted for the treatment of gases of combustion delivered from a furnace using pulverized fuel and the draft through the flues and through the separating chambers is an induced draft or suction, thereby insuring a substantial increasing in the speed of the flow of the gases as they traverse the tapering inlet chambers 21 and a maintenance of that increased speed through the passage between the deflectors and the semicircular perforated wall. The dust collecting chambers beneath the perforated partitions are closed chambers and consequently the air therein is subjected to little agitation during the normal operation of the device and, therefore, cooperate with the extended guiding surfaces 20′ to produce a substantially arcuate movement of the gases passing through the passage sufficient to develop in the particles floating in the gases sufficient centrifugal force to insure their engagement with the tongues 20 or the vertical wall 19″ of the openings 19 and the deposit of said particles in the settling chambers.

The dust bearing gas flows downwardly through the downcomer tubes 2 of the air heater and is delivered directly into the U-shaped passage, so that gravity as well as centrifugal force aids in the separation of the dust. This passage serves the dual purpose of reversing the direction of flow of the gas and removing the dust therefrom. In the embodiment illustrated in Fig. 2, the gas is cooled because of the heat transfer. Its volume therefore decreases, and the gas velocity in the upcomer tubes 3 is comparatively low. Because of this low velocity and since the flow in these tubes 3 is against gravity, there would be a marked tendency for any dust in the gas to become lodged in the tubes and obstruct the flow. By removing the dust from the gas prior to its entrance into the upcomer tubes, this difficulty is avoided.

The entire construction is very compact and requires but very little space for its installation. The parts are simple and inexpensive to manufacture and assemble.

Having thus described my invention, what I claim and desire to protect by Letters Patent of the United States is:

1. In combination, in a dust removing system including a dust generator, a flue leading from said dust generator, an exhaust fan in said flue for producing a strong induced draft through said flue to carry the dust from said generator, and a dust remover and collector in said flue between said generator and said exhaust fan and comprising a casing having an inlet chamber through which said dust carrying gases pass, said inlet chamber decreasing in cross-sectional area in the direction of gas travel to substantially increase the linear speed of said gases as they pass therethrough, said casing also being provided with a passage of the same cross-sectional area as that of the delivery end of said inlet chamber and communicating therewith, said passage following substantially a semicircle or path, the radius of which is relatively small, to produce in the particles of dust floating in said stream centrifugal force sufficient to throw said particles out of said stream to the outer wall of said semicircular passage, said outer wall being provided with narrow openings therethrough spaced relatively widely from each other to provide an extensive inner curved gas-guiding surface between said openings over which surface the gas may travel at a relatively high speed, whereby the dust borne by said stream and thrown outwardly by the contrifugal force developed therein is impelled through said openings, and a closed settling chamber below said outer wall of said passage.

2. The combination with a heat exchanger comprising a group of parallel tubes, a wall through which said tubes extend at one end, means to direct cool gas into contact with the external surfaces of the tubes, and means to direct dust bearing hot gas into the other ends of the tubes, of walls forming a U-shaped passage arranged to receive the gas discharged from the tubes, the outer wall of said passage having openings therethrough for the discharge of dust from said hot gas, and walls forming a closed dust collecting chamber outside of said openings.

3. The combination with a heat exchanger comprising a group of vertical downcomer tubes, a horizontal wall through which the lower ends of said tubes extend, means to direct cool gas into contact with the external surfaces of the tubes, and means to direct dust bearing hot gas into the upper ends of said tubes, of walls forming a U-shaped passage below said horizontal wall and arranged to receive the gas discharged from the lower ends of the downcomer tubes, the outer wall of said passage having openings therethrough for the discharge of dust from said hot gas, and walls forming a closed dust collecting chamber beneath said passage.

4. The combination with a heat exchanger comprising a group of vertical downcomer tubes and a group of vertical upcomer tubes, a horizontal wall through which the lower ends of all of said tubes extend, means to direct cool gas into contact with the external surfaces of said tubes, and means to direct dust bearing hot gas through the interior of said tubes, of walls forming a U-shaped passage below said horizontal wall and arranged to receive the gas discharged from the lower ends of the downcomer tubes, the outer wall of said passage having openings therethrough for the discharge of dust from said hot gas, and walls forming a closed dust collecting chamber beneath said passage.

5. The combination with a heat exchanger comprising walls forming a group of vertical downcomer passages and a group of vertical upcomer passages, means to direct cool gas into contact with the external surfaces of said passages, and means to direct dust bearing hot gas into the upper ends of the downcomer passages, of walls forming a U-shaped passage connecting the lower ends of the downcomer passages with the lower ends of the upcomer passages, the outer wall of said U-shaped passage having openings therethrough for the discharge of dust from said hot gas, and walls forming a closed dust collecting chamber beneath said U-shaped passage.

6. The combination with a heat exchanger comprising a group of vertical downcomer tubes and a group of vertical upcomer tubes, a horizontal wall through which the lower ends of all of said tubes extend, means to direct cool gas into contact with the external surfaces of said tubes, and means to direct dust bearing hot gas into the upper ends of the downcomer tubes, of walls forming a U-shaped passage below said horizontal wall and connecting the lower ends of the downcomer tubes with the lower ends of the upcomer tubes, the outer wall of said passage having openings therethrough for the discharge of dust from said hot gas, and walls forming a closed dust collecting chamber beneath said passage.

7. The combination with a heat exchanger comprising a group of vertical downcomer tubes and a group of vertical upcomer tubes, a horizontal wall through which the lower ends of all of said tubes extend, means to direct cool gas into contact with the external surfaces of said tubes, and means to direct dust bearing hot gas into the upper ends of the downcomer tubes, of a transverse baffle depending from the lower side of the horizontal wall and located between said groups of tubes, a perforated U-shaped wall beneath said baffle and forming the outer wall of a curved passage connecting the lower ends of said groups of tubes, and walls forming a closed dust collecting chamber beneath said passage.

8. The combination with a heat exchanger comprising a group of vertical downcomer tubes and a group of vertical upcomer tubes, a horizontal wall through which the lower ends of all of said tubes extend, means to direct cool gas into contact with the external surfaces of said tubes, and means to direct dust bearing hot gas into the upper ends of the downcomer tubes, of a transverse baffle depending from the lower side of the horizontal wall, said baffle being pear shaped in vertical cross section and located between said groups of tubes, a perforated U-shaped wall beneath said baffle and forming the outer wall of a curved passage connecting the lower ends of said groups of tubes, said passage having an inlet portion of decreasing cross-sectional area and an outlet passage of increasing cross-sectional area connected by a portion of constant cross-sectional area, and walls forming a closed dust collecting chamber beneath said passage.

In witness whereof, I have hereunto set my hand this 22nd day of September, 1930.

MAX H. KUHNER.